United States Patent
Chen et al.

(10) Patent No.: US 10,019,781 B2
(45) Date of Patent: Jul. 10, 2018

(54) IMAGE PROCESSING OF OBJECTS AND A BACKGROUND

(71) Applicant: International Business Machines Corporation, Armonk, NY (US)

(72) Inventors: Hsiao-Yung Chen, New Taipei (TW); Chao Yuan Huang, Taipei (TW); Hung-Jung Lai, Taipei (TW); Yin Qian, Shanghai (CN); Fei Shen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/267,132

(22) Filed: Sep. 15, 2016

(65) Prior Publication Data
US 2018/0075582 A1 Mar. 15, 2018

(51) Int. Cl.
| | |
|---|---|
| *G06T 3/40* | (2006.01) |
| *G06T 7/11* | (2017.01) |
| *G06T 9/00* | (2006.01) |
| *G06K 9/72* | (2006.01) |
| *G06T 7/00* | (2017.01) |

(52) U.S. Cl.
CPC ............ *G06T 3/4092* (2013.01); *G06K 9/726* (2013.01); *G06T 7/0081* (2013.01); *G06T 9/00* (2013.01); *G06T 2207/20016* (2013.01); *G06T 2207/20144* (2013.01); *G06T 2207/20148* (2013.01)

(58) Field of Classification Search
None
See application file for complete search history.

(56) References Cited

U.S. PATENT DOCUMENTS

| | | | |
|---|---|---|---|
| 6,005,974 A | 12/1999 | Kochi et al. | |
| 7,039,107 B1 * | 5/2006 | Pandel | G06T 9/007 375/240.08 |
| 7,720,371 B2 | 5/2010 | Hong et al. | |
| 8,194,175 B2 | 6/2012 | Kimoto | |
| 8,572,168 B2 | 10/2013 | Tahan | |
| 8,913,080 B2 | 12/2014 | James et al. | |
| 2003/0048925 A1 * | 3/2003 | Caillon | B07C 3/20 382/101 |
| 2009/0049408 A1 * | 2/2009 | Naaman | G06F 3/0482 715/835 |
| 2010/0164995 A1 | 7/2010 | Choi et al. | |
| 2014/0002440 A1 * | 1/2014 | Lynch | G06T 19/00 345/419 |
| 2014/0160148 A1 | 6/2014 | Barkett et al. | |

OTHER PUBLICATIONS

Sexton, Patrick; "How to Defer Images"; <https://varvy.com/pagespeed/defer-images.html>, Aug. 30, 2016.

* cited by examiner

*Primary Examiner* — Bernard Krasnic
(74) *Attorney, Agent, or Firm* — Nolan M. Lawrence (57) ABSTRACT

Disclosed aspects relate to image processing. An image includes one or more original objects and an original background. The image has a first resolution. A first object having a second resolution is obtained. The second resolution is not higher than the first resolution. The first object is corresponds to at least one of the one or more original objects. A first background with a third resolution is obtained. The third resolution is lower than the second resolution. The first background corresponds to a portion of the image which includes at least the original background. The first object and the first background are sent to a user to display a processed image.

10 Claims, 10 Drawing Sheets

IMAGE PROCESSING OF OBJECTS AND A BACKGROUND

BACKGROUND

The present disclosure relates to the field of computer systems, and more specifically, to image processing. With social networking being a part of the daily life of people, people may browse webpages with texts and pictures. In particular, with the popularity of social networking, users may write articles with pictures, such as related to travel stories or food, in order to share their experiences. Due to network statuses or processing capabilities, loading various images can be slow such as when users are browsing an article with lots of pictures, in particular pictures having high resolution. At times, users may stop reading until the complete picture is loaded. Mobile computing in such environments may further impact user experience.

To positively impact various challenges, a user may disable the load of pictures when reading articles with many high resolution pictures in order to accelerate the load of all texts in the article and make users read more smoothly. This solution may save the network traffic. However, users may lose the opportunity to browse the pictures. It may be challenging for a user to understand the article well such as if there is key information included in the disabled picture.

SUMMARY

Aspects of the disclosure relate to image processing. An image includes one or more original objects and an original background. The image has a first resolution. A first object having a second resolution is obtained. The second resolution is not higher than the first resolution. The first object is corresponds to at least one of the one or more original objects. A first background with a third resolution is obtained. The third resolution is lower than the second resolution. The first background corresponds to a portion of the image which includes at least the original background. The first object and the first background are sent to a user to display a processed image. Aspects may save resources such as bandwidth, disk, processing, or memory.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features, and advantages of the present disclosure will become more apparent wherein.

Throughout the drawings, the same or similar reference numerals represent the same or similar elements.

DETAILED DESCRIPTION

Various embodiments may be described in more detail with reference to the accompanying drawings, where the various embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The present disclosure may be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In embodiments of the present disclosure, there are various ways to express the resolution of an image. There is no limitation to the expression of resolution, provided that the expression is associated with size and definition of an image. That is, the higher the resolution is, the larger the image size is and the higher the image definition is, while the lower the resolution is, the smaller the image size is and the lower the image definition is. By way of an example, resolution may be expressed by a pixel count per area (length) unit. For example, DPI, IPI, PPI or PPC may be used for expressing the resolution. For example, resolution may also be expressed by pixel count per direction. Examples, resolution may be expressed as the number of pixel columns by the number of pixel rows. Aspects of the disclosure may include various performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

Figure 1:
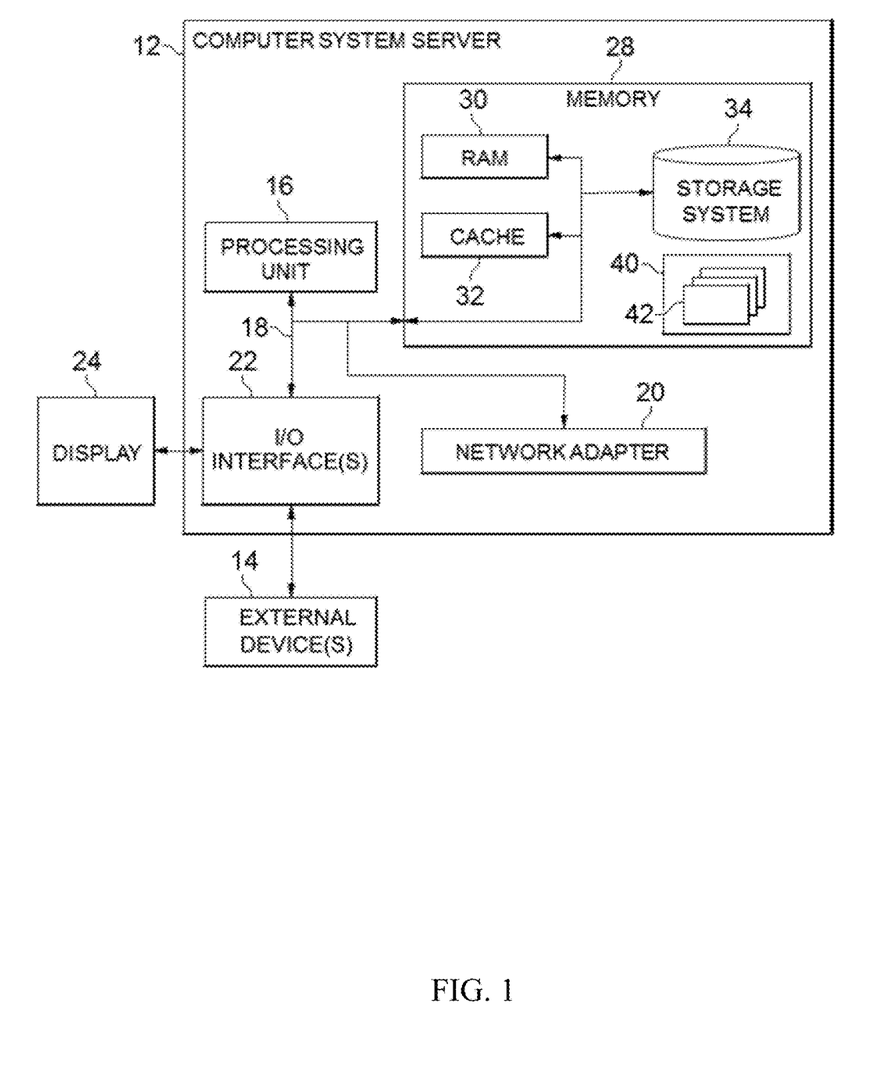
FIG. 1 is a block diagram of an electronic device suitable for implementing embodiments of the present disclosure.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device or system. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
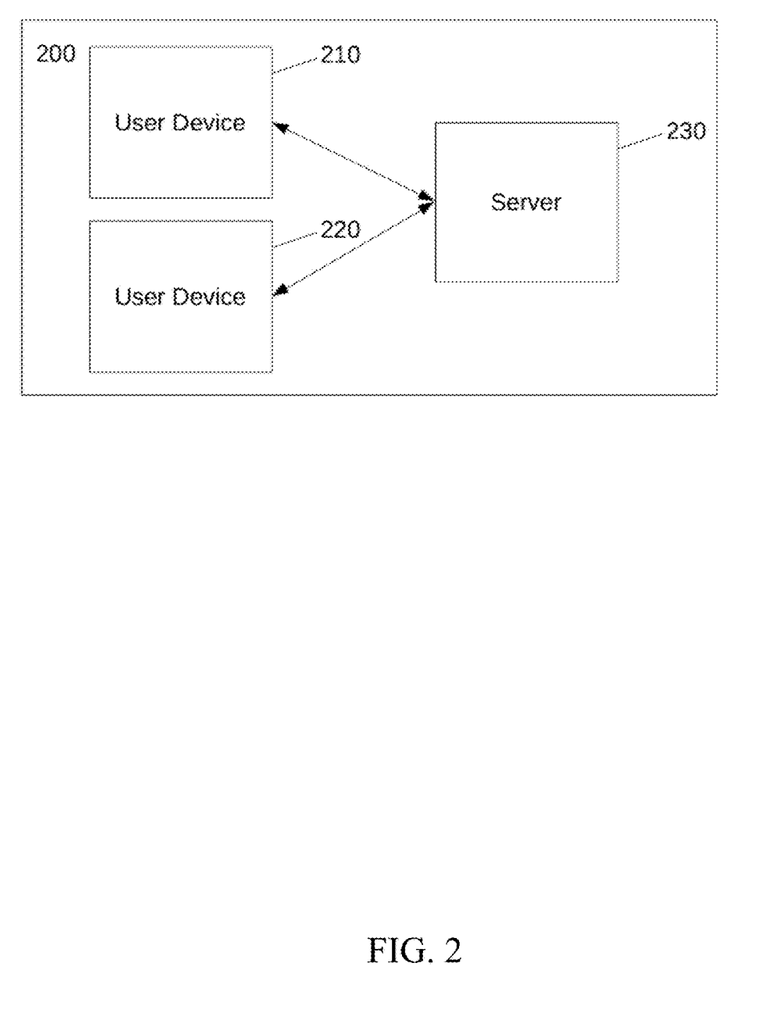
FIG. 2 is a block diagram of an environment where embodiments of the present disclosure can be implemented.

Now some example embodiments of the present disclosure will be described. FIG. 2 shows a schematic block diagram of an environment 200 in which the exemplary embodiments of the present disclosure may be implemented. The environment 200 comprises a first user device 210, a second user device 220, and a server 230. Each of the user devices 210 and 220 may be any appropriate electronic devices, examples of which include, but not limited to, one or more of the following: a desk computer, a portable computer, a tablet computer, a personal digital assistant (PDA), a cellular phone, a smart phone, and the like. The server 230 may store webpage including images and texts. In an embodiment, the server 230 may be a cloud server. The server 230 may be implemented using any appropriate computer/server, for example, the computer/server 12 described above with the reference to FIG. 1.

In response to a user request, the server 230 may send a webpage including texts and images to the user device 210 or 220. The communication medium between user devices 210, 220 and server 230 includes, but are not limited to, network connections such as the Internet, wide area network, local area network, metropolitan area network, and the like; telecommunication networks such as 2G, 3G, 4G telecommunication networks; near-field communications such as infrared, Bluetooth, and the like.

Figure 3:
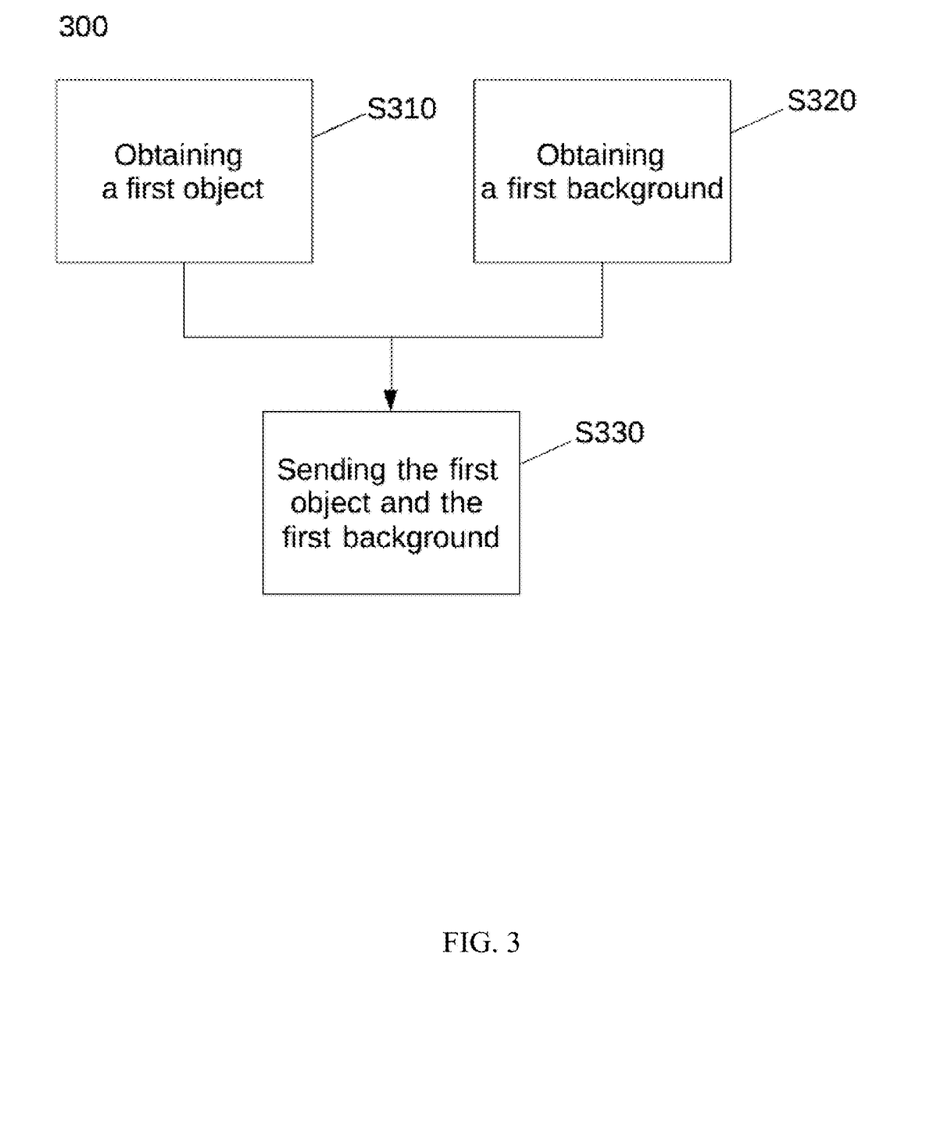
FIG. 3 is a flowchart of a method for image processing in accordance with embodiments of the present disclosure.

FIG. 3 shows a flowchart of a method 300 for image processing in accordance with an exemplary embodiment of the present disclosure. As described herein, the method 300 may be implemented by the server 230 for image processing.

The method 300 is entered in step S310, where a first object is obtained. In this embodiment, the image to be processed includes an original object and original background, wherein the original background may include remaining part of original image excluding the original object. It is to be understood that the original object included in the image may be one or more than one. For the convenience of discussion, hereinafter use more than one original object as example. The image has a first resolution. As the original objects and original background are part of the image to be processed, the original objects and original background have the first resolution also. It is to be understood that in this embodiment, there is no limitation to the image to be processed, which may be obtained via camera or smart terminal with camera functionality, or via software for drawing, or be pictures or figures processed by image processing software, etc. Both the original objects and original background are elements of the image to be processed. That is, they are part of the image to be processed. The first object is corresponding to at least one of the original objects. The first object has a second resolution. The second resolution is not higher than the first resolution. In this embodiment, the gap between the first resolution and the second resolution may be caused by object recognition. In another embodiment, the gap between the first resolution and the second resolution may further be caused by image compression. For example, in order to reduce the size of the first object, identified objects may be compressed to obtain an object with lower resolution, and the object with lower resolution is stored as the first object. It is to be understood that the gap between the first resolution and the second resolution at most may cause a slight image distortion. In an embodiment of this present disclosure, the first resolution is same with the second resolution. Hereinafter for the convenience of discussion, the embodiments below are described with an assumption that the first resolution is equal to the second resolution.

Figure 4:
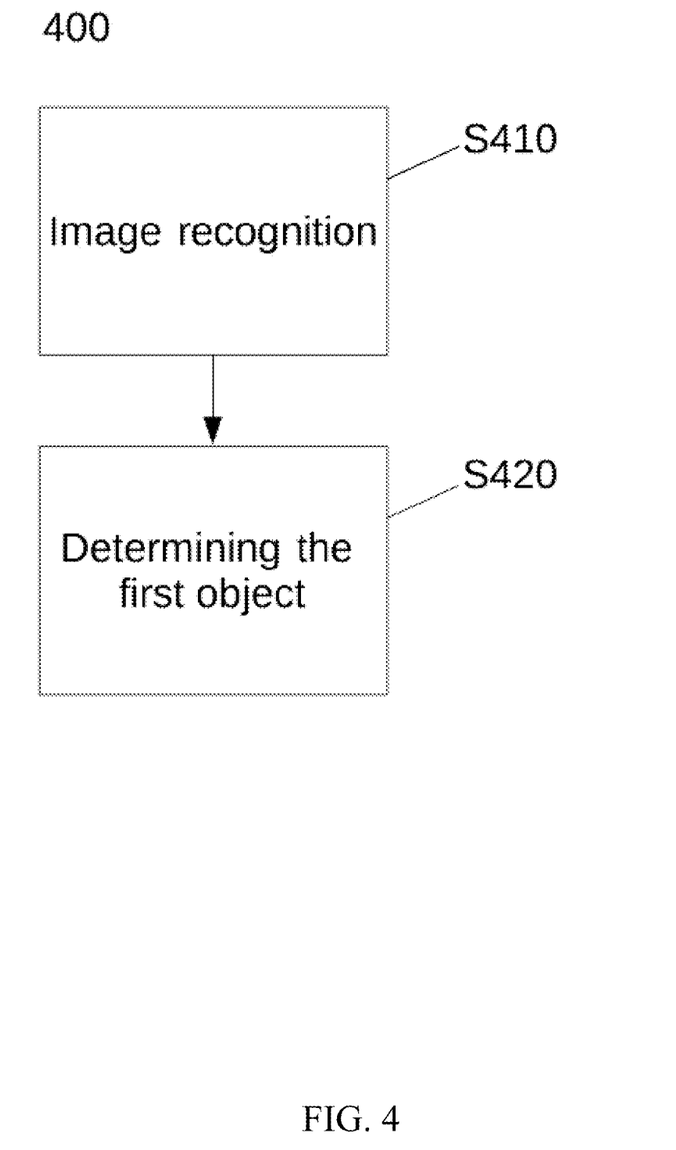
FIG. 4 is a flowchart of a method of obtaining a first object in accordance with embodiments of the present disclosure.

Referring to FIG. 4, an implementation of step S310 is provided as following. As shown in FIG. 4, a method 400 for obtaining the first object is provided in accordance with an embodiment of the present disclosure. The method 400 starts from step S410, in which original object of an image to be processed is identified from the image. After performing step S410, identified objects and the labels corresponding to the identified objects may be obtained. It is to be understood that the result of step S410 may not include the labels. If the result does not include the labels, the labels associated with identified objects may be obtained through other ways.

By way of example, step S410 may be implemented by existing object recognition technology in the field of image processing. For example, the object recognition technology may be used for finding and identifying object(s) in an image or a video sequence. An example of object recognition technology comprises: training a recognition module with database including known objects and corresponding labels of the known objects as input; then inputting the image to be identified to the recognition module which may output object(s) included in the image to be identified and labels corresponding to the object(s). The object(s) in the output may be the extracted one(s) which is separated from the original image, or be marked region in the original image (for example the boundary of the object is marked). It is to be understood that if the outputted object is marked region in the original area, a further step to extract the marked area to form a separate image file is needed, in order to store or send the first object. The outputted label corresponding to the object is used for indicating what the object is. By way of example, if the object in an image is a dog, the label may be "dog". In an embodiment of this present disclosure, by way of example, following appearance-based methods may be used to implement step S410: Edge Matching, Divide-and-Conquer Search, Greyscale Matching and etc. In another embodiment of present disclosure, following feature based methods may be used to implement step S410: Interpretation Trees, Hypothesize and Test, Pose Consistency, Pose Clustering and etc.

After step S410, step S420 is performed. Step S420 comprises: selecting the first object from the objects identified in step S410. In an embodiment of this present disclosure, according to the subject of context associated with the image, the object corresponding to the subject is chosen from the identified objects as the first object. Users often issue images together with texts, therefore the texts which have close relationship with the images consist the context associated with the images. By way of example, the context associated with images may include texts near the image in position and/or the title at each level to the section where the image located. For example, a user issues an article to introduce sport equipment, which article includes lots of pictures of various sport equipment. The title of the article is "unusual sport equipment in a stadium". Such title may be considered as context associated with pictures in the article. Another example, a user issues an article to introduce the travel in Southeast Asia, which article includes many pictures including classical buildings of cities. There is one picture includes fish-tailed lion. The title of the section where the picture located is "Singapore". Then the title of the section may be considered as the context of the picture. For example, the last paragraph in front of the position of the picture and the first paragraph behind the position of the picture may be considered as context associated with the picture. By determining the first object according to the subject of the context, the object having closest relationship with context will be chosen automatically and presented to the user with relatively high resolution, while the other parts will be presented with relatively low resolution which may be blurry. This helps improve the user experience significantly and ensure important details in image are still clear while the reading is smooth.

It is to be understood that if the output of object recognition does not include the labels associated with identified object, the identified object may be labeled manually.

Figure 6:
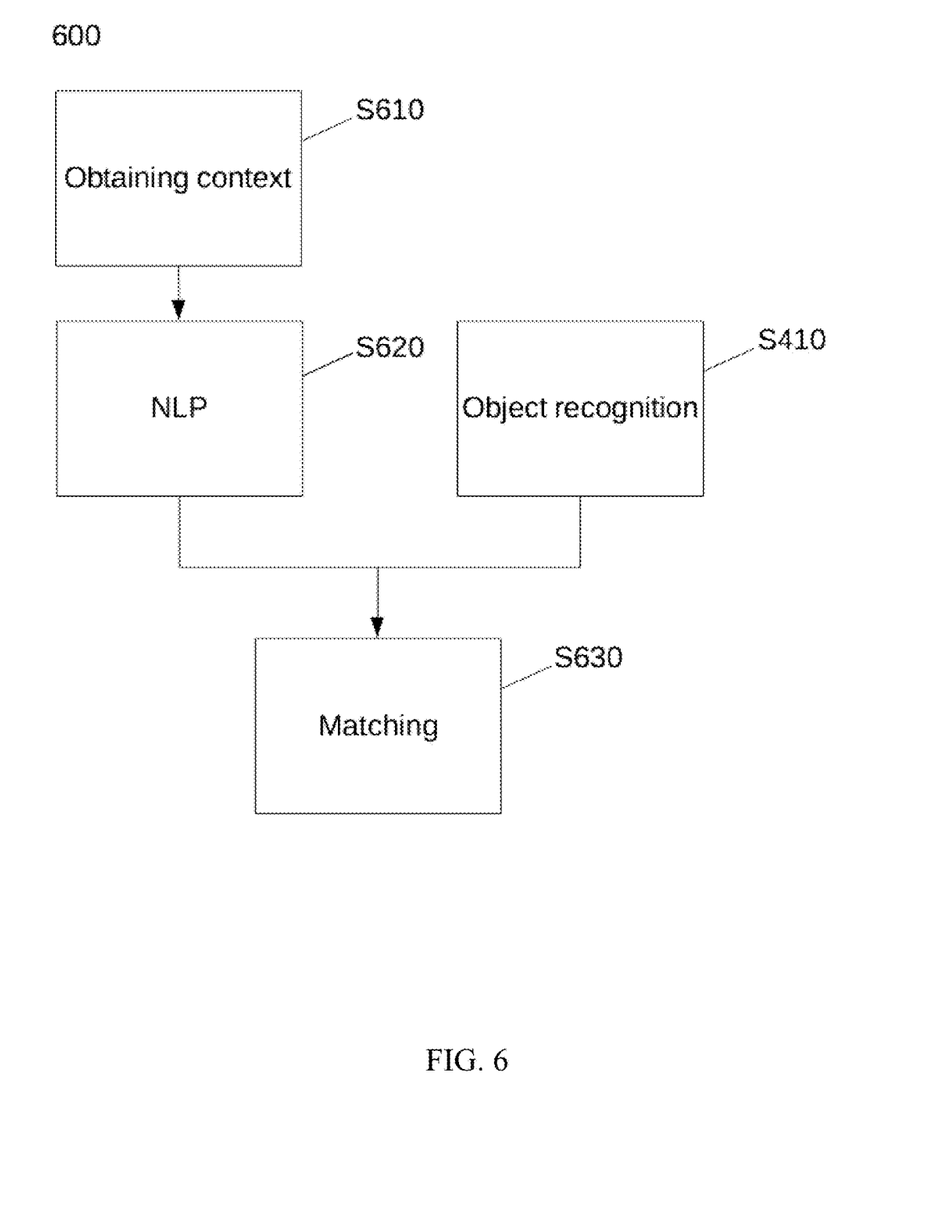
FIG. 6 is a flowchart of another method of obtaining a first object in accordance with embodiments of the present disclosure.

In an embodiment of the present disclosure, the first object is obtained via the method 600 as shown in FIG. 6. The method 600 shown in FIG. 6 starts from step S610. At step S610, context corresponding to the image is obtained. Then the method 600 proceeds to step S620. At step S620, NLP (Natural Language Processing) is performed to the obtained context. Specifically, step S620 may be implemented by existing NLP technologies. For example, semantic analysis may be used for implementing step S620.

After step S620 performed, an output for indicating subject of the context is obtained. In an embodiment of this present disclosure, an exemplary output may include at least one of: sentiment, keyword, entities, high level concepts. Based on output of step S620, S630 is performed. At step S630, the labels corresponding to identified object are matched with said output, and the object corresponding to the matched label is determined as the first object. In an embodiment of the present disclosure, the matching may be implemented by linguistic search, or further by fuzzy search. In an embodiment of the present disclosure, the labels used in step S630 may be from the output of the step S410. It is to be understood that step S630 may be an implement of step S420.

In above embodiments, output of object recognition may include one or more identified objects. In addition, the output may include labels associated with said one or more identified objects, each identified object may associate with one or more labels. In step of matching output of NLP and labels, matched labels may be one or more than one. Identified object corresponding to said one or more matched labels may be one or more than one. It is to be understood that the match of subject and labels may be performed according to the output when the output does not include the subject per se but indicating the subject.

In an embodiment of the present disclosure, a real-time processing solution may be adopted. In the real time processing solution, in response to needs of sending a first object and a first background to a user, processing of the original image is performed. That is, the method 400 as shown in FIG. 4 is performed in real-time to obtain the first object, and then the first object is sent to the user in following steps. In another embodiment of the present disclosure, a pre-processing solution may be adopted. In the pre-processing solution, the original image is processed in advance in order to obtain the first object and store it. In response to needs of sending a first object and a first background to a user, the stored first object is obtained. In the pre-processing solution, the method 400 may also be used for pre-processing of the original image. So for example, the step 310 may include obtaining the stored first object. Upon the pre-processing solution is adopted, for pre-processing of the image, it may be initiated in response to upload of the image or in response to the idle status of the server. It may also be initiated periodically.

By using pre-processing solution, the first object may be prepared before receiving user request, which may efficiently utilize the idle status of the server to complete the steps of image processing, NLP and etc. And when facing requests from plurality users, pre-processing solution is able to perform above processing steps only once.

By using real-time processing solution, it is possible that only the image needed to be processed is processed. By way of example, for a travel story, there is no need for any user to browse it with help provided by the present disclosure, so that using real-time processing solution may avoid the processing of the images in this travel story and may not need to occupy memory space to store the result of image processing. It is to be understood that when the real-time processing solution is adopted, the image may be only processed once for the first time the request to the image being received, and then the processed result is stored. When another request to the image is received, there is no need to process the image again, and the first object may be obtained directly from the memory.

It is to be understood that to reduce the size of stored first object or the size of the first object to be sent, the image compression may be performed. The compression may be lossy or lossless. The compression may be performed whenever needed, which is not limited by this disclosure. By way of example, the compress may be performed before the sending in step S330, or before storing the first object.

Return to FIG. 3, step S320 and step S310 may be performed substantially concurrently, or step S320 and step S310 may be performed in succession. If step S320 and step S310 are performed in succession, the present disclosure does not limit the sequence of performing, either step S310 or step S320 may be performed first. At step S320, a first background is obtained. The first background is corresponding to a portion of the image including at least the original background, and the first background has a third resolution. The third resolution is lower than the first resolution as well as the second resolution. In an embodiment of the present disclosure, the third resolution is far lower (e.g., lower by a threshold percentage such as 10/30/50/70/90%) than the second resolution.

In an embodiment of the present disclosure, by way of example, the step S320 may include: compressing the original image to a low resolution image, and taking the low resolution image as the first background. That is, the correspondence between the original background and the first background is that a low resolution image is obtained by compressing the original image including the original background, and the low resolution image is taken as the first background. Said compression may be implemented by an existing lossy compression technology in the field of image processing. In the embodiment, obtaining the first background by compressing the whole original image may be more convenient for image composition. And no matter which object is sent to the user, same first background may be used for image compression. In this case, there is no need to obtain an image which includes the remaining part of original image excluding the original object corresponding to the first object. In addition, at user side, said first background may be used to image composition by simply utilizing overlay technology, when the first background and the first object are composited to obtain a processed image.

In an embodiment of the present disclosure, by way of example, step S320 may include: compressing the remaining part of original image excluding the original object corresponding to the first object to a low resolution image and taking the low resolution image as the first background. In this embodiment, the correspondence between the first background and the original background is that the original background and the original objects except the object corresponding to the first object are composited to a low resolution image and said low resolution image is taken as the first background.

It is to be understood that either real-time processing solution or the pre-processing solution may be used for obtaining the first background. If the pre-processing solution is adopted, the first background may be stored after being obtained according to above method, in order to directly obtain the stored first background in following steps. That is, in pro-processing solution, the original image is compressed to low resolution image in advance and the low resolution image is stored as the first background, or the remaining part of original image excluding the original object corresponding to the first object are compressed to a low resolution image and the low resolution image is stored as the first background. In this case, step S320 may include obtaining the store first background.

Next, the method 300 proceeds to step S330. At step S330, the first object and the first background are sent to user to display a processed image. In an embodiment of the present disclosure, the processed image is a composited image obtained by utilizing the first object and the first background. Said processed image comprises a relatively clear first object and remaining part which is relatively blurry. By using partially load solution provided by method 300, size of contents to be transmitted is reduced as the resolution of said contents is degraded, so that the time needed for loading the image by users is saved and the bandwidth for date usage is saved too. Meanwhile, reading speed is accelerated, the reading is more fluent and the user experience is improved. And more important, although the resolution of image is degraded, the key object still has relatively high resolution, which makes the user be able to see the key object clearly. Therefore, the definition and details of the image will not be affected by degraded resolution.

The real-time processing resolution and pre-processing resolution of the first object and the real-time processing resolution and pre-processing resolution of the first background may be combined randomly, which may obtain more implementations. By way of example, in an embodiment of the present disclosure, the real-time processing resolution may be adopted for the first object, while the pre-processing solution may be adopted for the first background. In another embodiment of the present disclosure, the real-time processing solution is adopted for both the first object and the first background. In yet other embodiment, the pre-processing solution is adopted for both the first object and the first background. In yet other embodiment, the pre-processing solution is adopted for the first object, while the real-time processing solution is adopted for the first background.

It is to be understood that the pre-processing solution may be implemented by the server 230, or other servers which is not limited by this disclosure. Similarly, identified objects and labels may be stored in the server 230, or other servers. Identified objects and labels may be stored separately or together. And it is to be understood that the processing to the first object and the first background may be implemented by different servers. In addition, in processing to the first object, object recognition and NLP may be implemented by different servers.

In an embodiment of the present disclosure, as described above, lossy/lossless image compression may be performed to reduce the size of the first object to be transmitted or to be stored. Said compression ensures that resolution of the first object is high enough for user to see the details of the first object clearly, when the processed image is displayed at user side. However, the lossy compression performed to obtain the first background needs to use a large compression ratio. That is the resolution in such lossy compression needs to be reduced significantly. The resolution of the first background may make background of the processed image has only a hazy outline when the processed image is displayed at user side.

In an embodiment of this present disclosure, whether or not performing the image compression to the first object and/or the first background before transmission is determined according to the user's network condition. In addition, the compression ratio may be determined by the user's network condition too. By way of example, if user's network condition is bad, a larger compression ratio may be utilized to obtain the first background, where the background of the processed image will be blurrier.

In above embodiments, for user's convenience to read, a default first object is provided to users. By way of example, the default first object is chosen according to the context of the image. It is to be understood that the first object may be a prominent one among all identified objects. In an embodiment, in additional to default first object, an additional second object with high resolution may be provided to user, which second object may be provided according to user's choice. It helps provide more options and flexibility to users.

In an embodiment of the present disclosure, the method provided by above embodiments may further comprises: In response to user requesting a second object different with the first object, obtaining the second object; and sending the second object. In this embodiment, the second object is corresponding to at least one of original object and the second object has a fourth resolution. The fourth resolution may be same with the second resolution which the first object has, or may not. The fourth resolution may be lower than or equal to the first resolution, and the fourth resolution may be higher than or in particular far higher than the third resolution. That is, similar to the first object, the second object also has a high resolution, which makes users see the details of the object clearly not only an outline.

In an embodiment of this present disclosure, providing the labels corresponding to identified objects to user may enable the user to choose another object which is expected to be seen clearly according to the labels. When providing the labels to the user, a drop-down menu may be used or the labels are displayed where the corresponding object is in the processed image in a semitransparent way. In an embodiment of the present disclosure, by way of example, the labels provided to users may be obtained in step of object recognition according to method provided in above embodiments.

Then in response to user's selection to the label, identified object corresponding to the selected label is provided to the user as the second object. In an embodiment of the present disclosure, no matter the real-time processing solution or the pre-processing solution is adopted for obtaining the first object, identified objects and labels may be stored in order to provide the second object later or to provide the first object again to another user. Therefore, there is no need to perform object recognition again when obtaining the second object, as the identified objects stored before may be used directly. It is to be understood that present disclosure does not limit that object recognition is performed again when obtaining the second object. By way of example, object recognition needs to be performed again, if identified object is lost or destroyed accidently.

In an embodiment of the present disclosure, after obtaining the second object, the second object may be sent to user for the user to composite a processed image including the relatively clear second object. It is to be understood that the first background may not be included in said sending. After the user receiving the second object, the user may composite the second object with processed image obtained via previous steps, in order to obtain an image including a second object with relatively high resolution. It is to be understood that the first object and the first background obtained in previous steps may be used together with the second object in image composition step.

In an embodiment of the present disclosure, the second object may be obtained based on clicking/cycling certain area in the processed image. By way of example, a blurry object in processed image is clicked by user, or an area including a blurry object in processed image is cycled by user. The identified object corresponding to clicked/cycled object is sent to the user according to user's selection in this embodiment.

According to above embodiments providing the second object, more flexibility is provided to the user, and user may select object which is interested. Such interested object will be presented clearly.

In an embodiment of the present disclosure, after step S330, user may receive a first object and a first background. Optionally, user may further receive a second object. At user side, received first object, first background and second object (optional) are composited to a processed image by image compression. A feature of such processed image is that the first object and second object (optional) has relatively high definition, so details of them can be seen clearly, while the remaining part has relatively low definition, so details of it cannot be seen clearly, in particular, it may have only a hazy outline. It is to be understood that in image composition, interpolation is often used to fill pixel to the first background with low resolution.

In an embodiment of present disclosure, an initiation mechanism to methods provided in above embodiments is provided. By way of example, a switch may be set for user. When the switch is on, all images requested by user may be processed by said methods. In this case, all images displayed to user are processed images which have blurry background and one or more clear objects (clear object may be default or chosen by user). When the switch is off, the original image will be upload for user without using the methods in above embodiments.

In an embodiment of the present disclosure, initiation mechanism may further include a determination of user condition. By way of example, the user network condition is compared with a threshold. The method will not be adopted if the network condition is good enough, while the method will be initiated if the network condition is bad. It is to be understood that the user network condition may be measured by various factor, such as bandwidth. User condition may further comprise condition of user terminal.

In an embodiment of the present disclosure, initiation mechanism may further include a determination of time needed for image upload. By way of example, the time for user to upload image is estimated according to user network condition and size of the image. In response to estimated time being more than a threshold, above method is initiated. Exemplary, the threshold may be set as 6 seconds. A repeated upload may be avoided by using said estimation method at server side. Whether to initiate the method is flexibly determined according to user condition, which may bring most convenience to user. Specifically, the method of estimation may include obtaining an estimated time through dividing the size of image by speed of user network. By way of example, speed of user network is 1 M/s, and size of image is 4 M, then the estimated upload time is 4 seconds.

In an embodiment of the present disclosure, initiation mechanism may start at user side. By way of example, upon the waiting time exceeds a threshold, if image upload is still incomplete or does not up to a predetermined ratio, an instruction to initiate above methods is sent. Exemplary, the threshold may be set as upload does not reach 10% after 3 seconds. In addition, when initiation mechanism starts from user side, the user may be asked whether to initiate the method instead of sending the instruction directly upon the threshold is reached. Another example, if upload does not reach 20% when waiting time exceeds 4 seconds, the user may be reminded that the waiting time for upload may be too long and be asked whether to initiate partially load solution.

In an embodiment of the present disclosure, above initiate mechanism is to initiate at least one of step S310 and step S320.

Refer to FIG. 5a-5d, a detailed example is provided in order to make this disclosure much clearer.

Figure 5A:
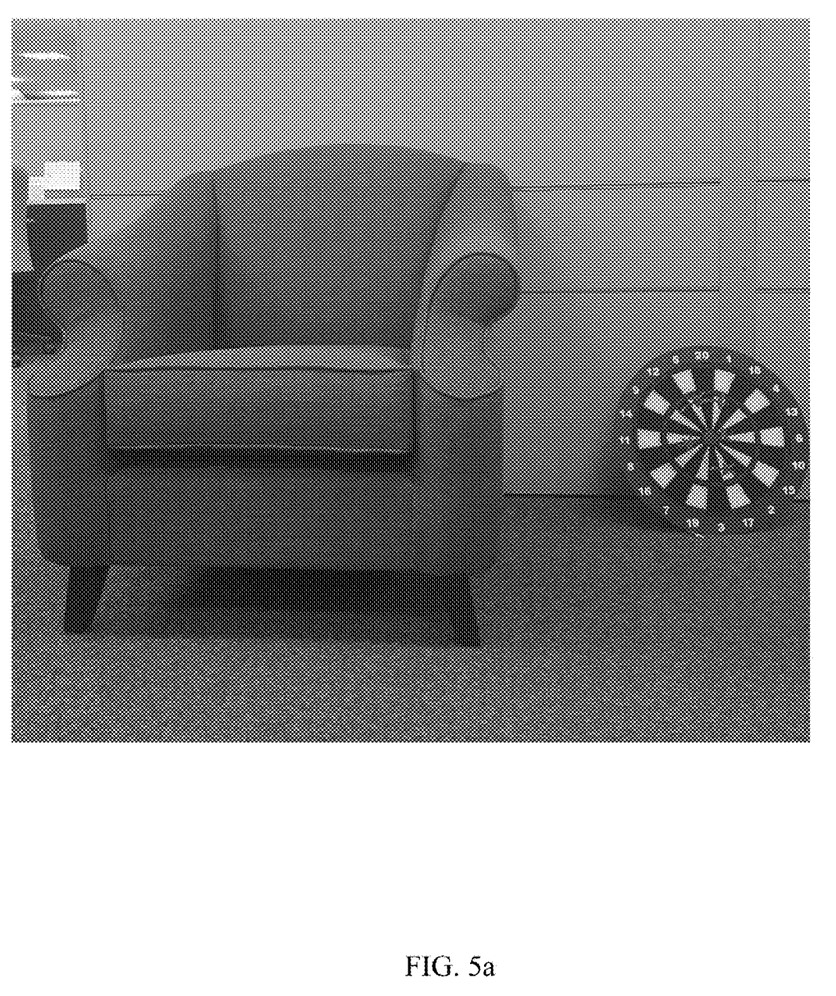
FIG. 5*a* shows an example of original image in accordance with embodiments of the present disclosure.
Figure 5B:
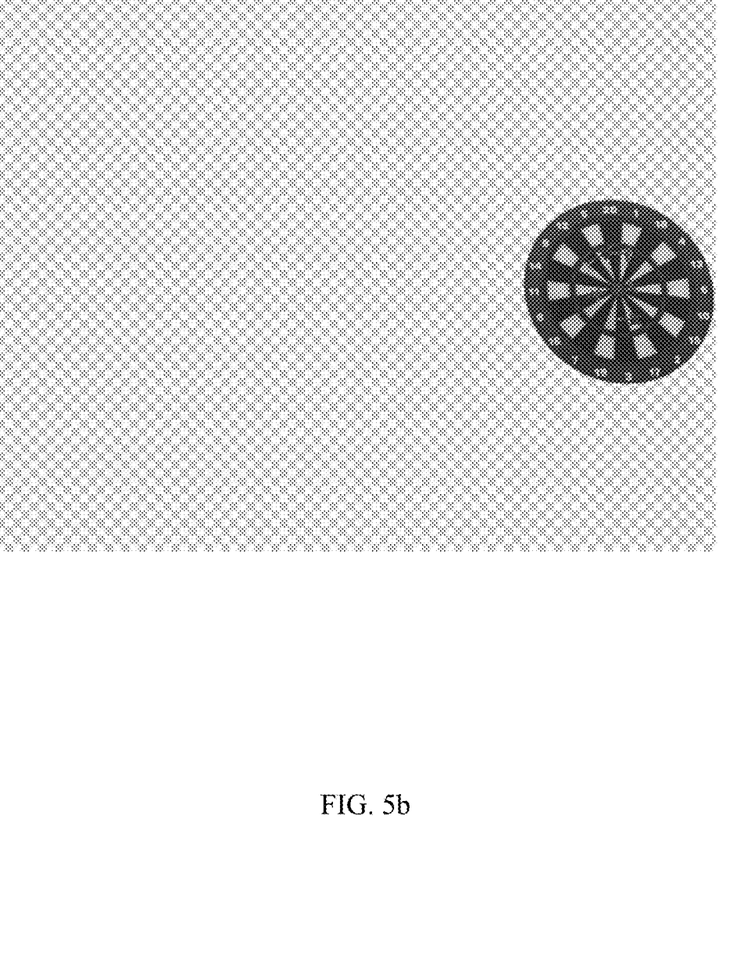
FIG. 5*b* shows an example of a first object in accordance with embodiments of the present disclosure.

User device 210 issues an environment introduction. This introduction includes an original image as shown in FIG. 5a. Both sofa and dart board in the original image are original objects, and remaining part is original background. Resolution of the original image is 2988*2734. Size of the original image is 9.8 M. After said introduction is issued, object recognition is performed by the server 230 to the original image. The output of object recognition includes identified object A which is sofa and identified object B which is dart board. The output further includes a label "sofa" corresponding to object A and a label "dart board" corresponding to object B. Identified object A and identified object B is stored as separate image 1 (not shown) and separate image 2 (as shown in FIG. 5b) respectively. Image 1 and image 2 has same resolution with original image, which is 2988*2734, and size of image 2 is 960K.

Keyword "entertainment" is obtained via perform NLP to context of original image shown in FIG. 5a. Server 230 matches the label with the keyword, and determine the label matching the keyword is "dart board", so that the object A is determined as the first object.

Figure 5C:
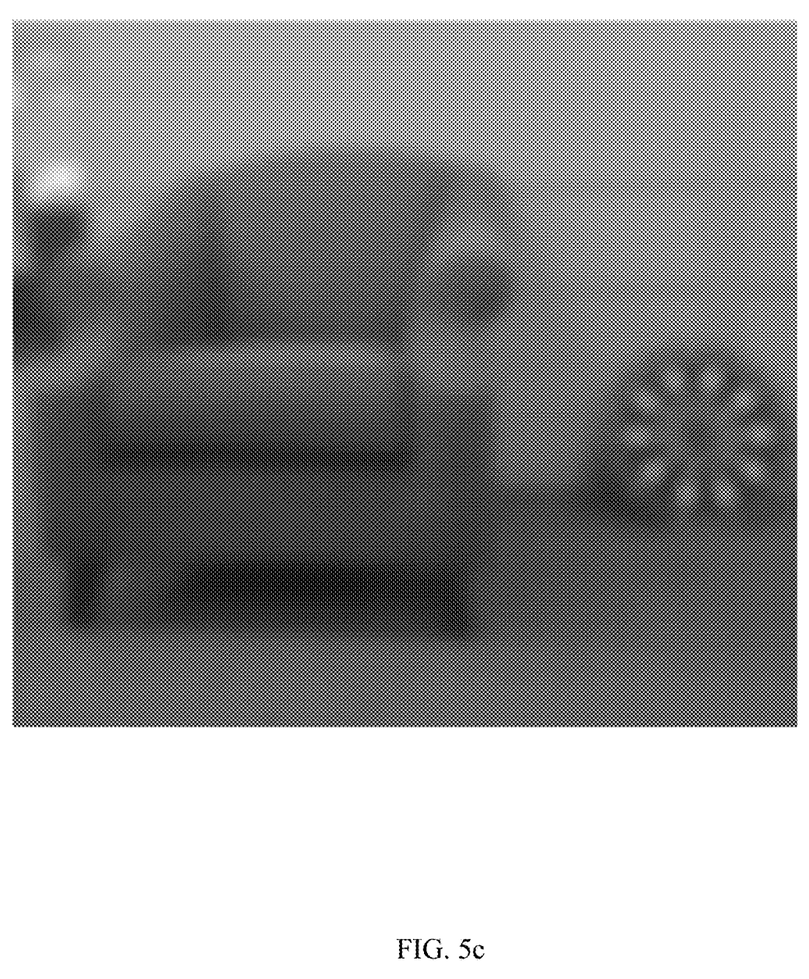
FIG. 5*c* shows an example of a first background in accordance with embodiments of the present disclosure.

The server 230 performs image compression on original image shown in FIG. 5a in order to obtain a low resolution image as shown in FIG. 5c. The resolution of the low resolution image is 750*684. The low resolution image is taken as the first background. Size of the first background is 212K. It can be seen that in the first background, all elements have only hazy outlines.

User device 220 sends a request to server 230 to browse the environment introduction. After receiving the request, server 230 determines that network speed of user device 220 is 800K/s. Therefore, time to loading the original image is estimated as about 12 seconds. To improve the user experience, server 230 determines to send the first object and the first background instead of original image to user device 220. As size of the first background is only 212K and size of the first object is 960K, the size of contents sent by server 230 to user device 220 is only 1172K. Comparing with the size of original image 9.8 M, about 8.6 M is saved. And to load contents with 1172K, user device 220 only needs about 1.5 seconds.

Figure 5D:
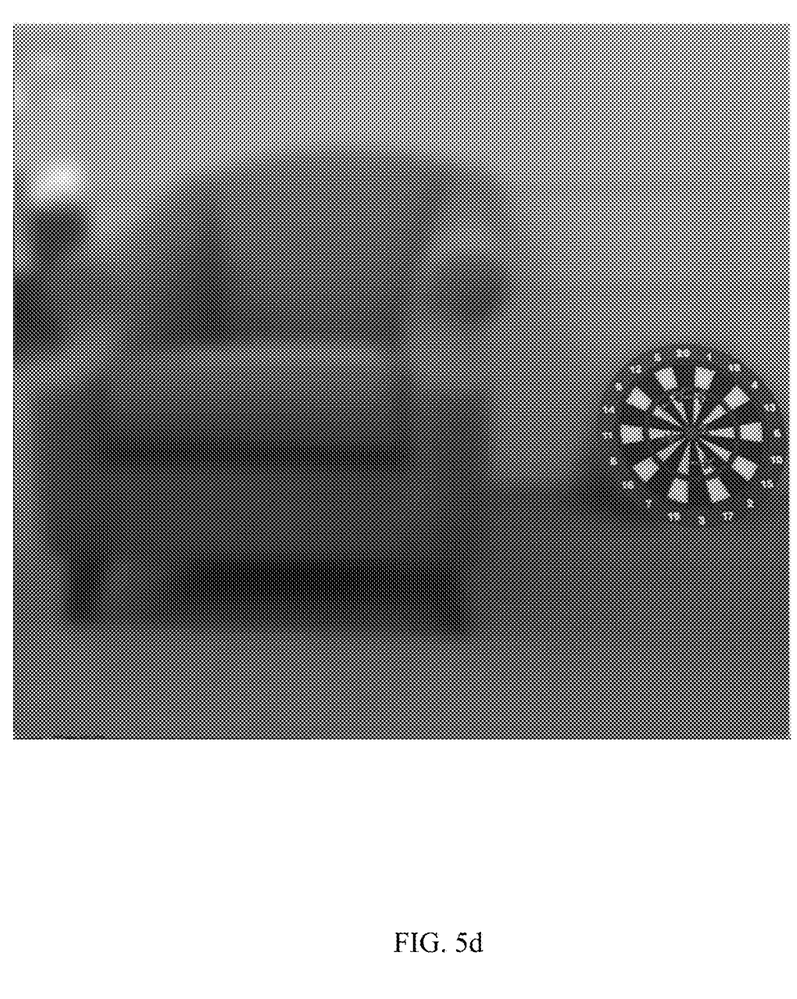
FIG. 5*d* shows an example of a processed image in accordance with embodiments of the present disclosure.

After the first object and the first background being received by user device 220, a processed image as shown in FIG. 5d is obtained by simply utilizing overlay technology. The processed image includes relatively clear dart board and blurry sofa and background. It helps user to know there is a dart board for entertainment in the environment from the processed image when reading the context about entertainment, and the user does not need to wait a long time to load the clear sofa and background.

In addition, a drop-down menu including option as "sofa" is provided to the user. In response to "sofa" being selected by the user, server 230 may send the stored object A as the second object to the user. At user side, the second object may be used for image composition to obtain the processed image. Said processed image includes relatively clear sofa and dart board, while the other part of the processed image is relatively blurry.

It may be seen that the image displayed at user side is the processed image (for example as shown in FIG. 5d), which includes relatively clear first object and second object (optional) and blurry remaining part. Thus, the processed image will not affect user to perceive the image as important details are kept, meanwhile, the data usage is saved and the loading speed is accelerated.

Figure 7:
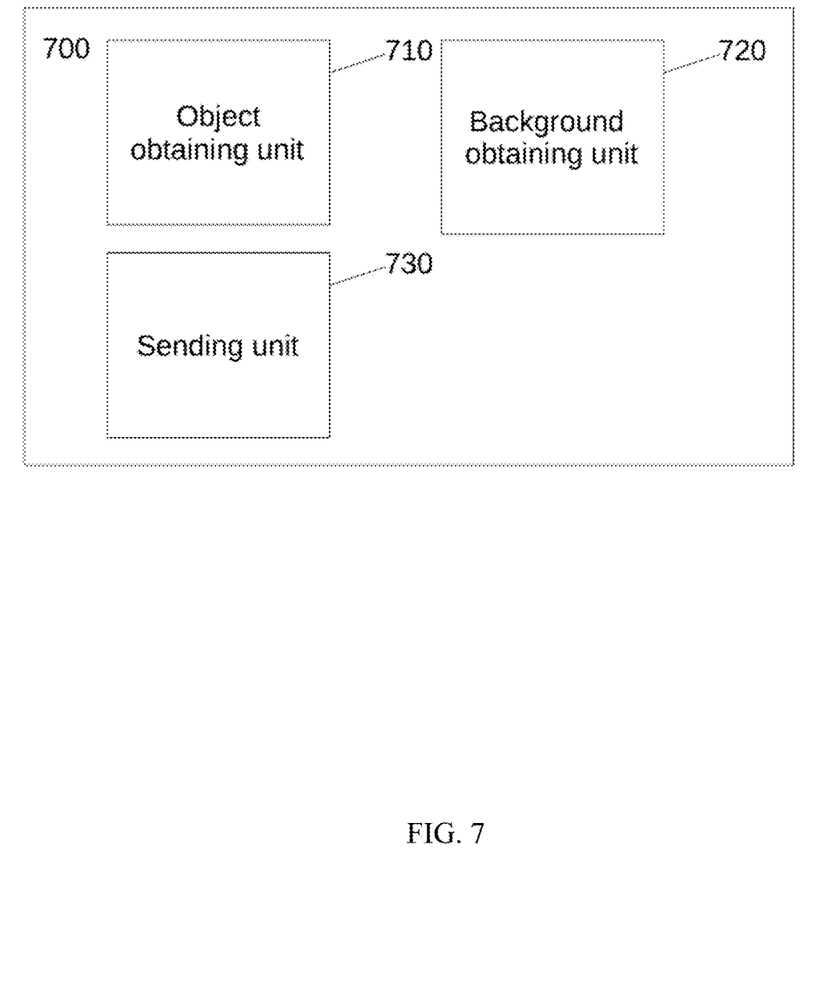
FIG. 7 is a block diagram of a system for image processing in accordance with embodiments of the present disclosure.

FIG. 7 shows a schematic block diagram of a system 700 for image processing according to the embodiments of the present disclosure. In the embodiment as shown in FIG. 7, the image includes one or more original objects and original background and the image has a first resolution. As shown in the figure, the system 700 comprises: an object obtaining unit 710 configured to obtain a first object, a background obtaining unit 720 configured to obtain a first background and a sending unit 730 configured to send the first object and the first background to a user to display a processed image. The first object is corresponding to at least one of the one or more original objects and the first object has a second resolution. The second resolution is not higher than the first resolution. The first background is corresponding to a portion of the image including at least the original background and the first background has a third resolution. The third resolution is lower than the second resolution.

In an embodiment of the present disclosure, the first object is obtained via identifying the one or more original objects and selecting the first object from the identified object.

In an embodiment of the present disclosure, according to a subject of a context, the selecting includes selecting an object corresponding to the subject from the identified object as the first object, wherein the context is associate with the image.

In an embodiment of the present disclosure, the system 700 further comprises a NLP unit configured to perform NLP to the context in order to get an output indicating the subject of the context. And the selecting comprises: matching a label with the subject according to the output where the label is corresponding to the identified object and determining the object corresponding to the matched label as the first object.

In an embodiment of the present disclosure, the first background is a low resolution image obtained by compressing one of 1) the image and 2) remaining part of the image excluding the original object corresponding to the first object.

In an embodiment of the present disclosure, the object obtaining unit 710 is further configured to in response to a second object different from the first object being requested by the user, obtaining the second object. The second object is corresponding to at least one of the one or more original objects. The second object has a fourth resolution and the fourth resolution is not higher than the first resolution and higher than the third resolution. The sending unit 730 is further configured to send the second object to the user.

In an embodiment of the present disclosure, the system 700 further comprises option providing unit configured to providing a label corresponding to the identified object to the user. And the object obtaining unit 710 is configured to in response to user's selection of a label, obtaining a second object which is corresponding to the selected label.

In an embodiment of the present disclosure, the system 700 further comprises an estimating unit and an initiating unit. The estimating unit is configured to estimate time to load the image by the user according to user's network condition and size of the image. The initiating unit is configured to in response to the estimated time being longer than a threshold, initiating at least one of the object obtaining unit 710 and the background obtaining unit 720.

In an embodiment of the present disclosure, the label is obtained via identifying the one or more original objects from the image.

In an embodiment of the present disclosure, the system 700 further comprises a compression unit configured to performing image compression to the identified objects. And the selecting comprises selecting the first object from the compressed object.

In an embodiment of the present disclosure, the compression unit is configured to perform image compression to the first object after the first object being selected.

In an embodiment of the present disclosure, the third resolution is far lower than the second resolution.

It should be noted that for the sake of clarity, FIG. 7 does not show optional units or sub-units included in the system 700. All features and operations as described above are suitable for system 700, respectively, which are therefore not detailed here. Moreover, partitioning of units or subunits in system 700 is exemplary, rather than limitative, intended to describe its main functions or operations logically. A function of one unit may be implemented by a plurality of other units; on the contrary, a plurality of units may be implemented by one unit. The scope of the present disclosure is not limited in this aspect.

Moreover, the units included in the system 700 may be implemented by various manners, including software, hardware, firmware or a random combination thereof. For example, in some embodiments, the apparatus may be implemented by software and/or firmware. Alternatively or additionally, the system 700 may be implemented partially or completely based on hardware. for example, one or more units in the system 700 may be implemented as an integrated circuit (IC) chip, an application-specific integrated circuit (ASIC), a system on chip (SOC), a field programmable gate array (FPGA), and the like. The scope of the present intention is not limited to this aspect.

The present disclosure may be a system, an apparatus, a device, a method, and/or a computer program product. The computer program product may include a computer readable storage medium (or media) having computer readable program instructions thereon for causing a processor to carry out aspects of the present disclosure. For example, in some embodiments, one or more computer program products may be tangibly stored on a non-transient machine-readable medium and comprise machine-executable instructions. The instructions, when executed on a device, cause the device to implement the methods 300, 400 and/or 600 as described above.

According to an embodiment of the present disclosure, a computing system is provided. The computing system may be used for image processing. The image comprises one or more original objects and an original background. The image has a first resolution The computing system comprises a processing unit and a memory coupled to the processing unit and storing instructions thereon. The instructions, when executed by the processing unit, where the, performing acts including obtaining a first object having a second resolution, wherein the first object is corresponding to at least one of the one or more original objects and the second resolution is not higher than the first resolution; obtaining a first background having a third resolution, wherein the first background is corresponding to a portion of the image comprising at least the original background and the third resolution is lower than the second resolution; and sending the first object and the first background to a user to display a processed image.

According to an embodiment of the present disclosure, a computer program product is provided. The computer program product is tangibly stored on a non-transient machine-readable medium and comprises machine-executable instructions. The instructions, when executed on a device for image processing, wherein the image comprises one or more original objects and an original background, the image has a first resolution, causing the device to: obtain a first object having a second resolution, wherein the first object is corresponding to at least one of the one or more original objects and the second resolution is not higher than the first resolution; obtain a first background having a third resolution, wherein the first background is corresponding to a portion of the image comprising at least the original background and the third resolution is lower than the second resolution; and send the first object and the first background to a user to display a processed image.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for image processing, wherein an image includes one or more original objects and an original background, and wherein the image has a first resolution, the method comprising:
   identifying one or more original objects from the image;
   performing Natural Language Processing (NLP) to a context associated with the image to get an output indicating a subject of the context associated with the image;
   selecting, according to the subject, a first object from the one or more identified original objects, wherein the selecting includes matching a label that corresponds to one of the one or more identified original objects with the subject according to the output and determining that the one of the one or more identified original objects corresponds to the matched label as the first object;
   estimating a time to load the image by a user;
   performing, in response to the estimated time being longer than a threshold, a compression of the first object, wherein the compressed first object has a second resolution not higher than the first resolution;

obtaining a first background having a third resolution, wherein the first background corresponds to a portion of the image which includes at least the original background, and wherein the third resolution is lower than the second resolution; and sending the compressed first object and the first background to the user to display a processed image.

2. The method of claim 1, wherein the first background is a low resolution image obtained by compressing a selection from the group consisting of: the image, and a remaining part of the image which excludes the original object corresponding to the first object.

3. The method of claim 1, further comprising:

in response to a second object different from the first object being requested by the user, obtaining the second object, wherein the second object corresponds to at least one of the one or more original objects, wherein the second object has a fourth resolution, and wherein the fourth resolution is not higher than the first resolution and is higher than the third resolution; and sending the second object to the user.

4. The method of claim 3, further comprising:

providing a second label corresponding to the second object to the user; and in response to a second object different from the first object being requested by the user, obtaining the second object includes: in response to a user selection of a selected label, obtaining a second object which corresponds to the selected label.

5. The method of claim 1, wherein the third resolution is lower than the second resolution by a threshold amount.

6. A computer program product being tangibly stored on a non-transient machine-readable medium and comprising machine-executable instructions, the instructions, when executed on a device for image processing, wherein an image includes one or more original objects and an original background, and wherein the image has a first resolution, causing the device to:

perform Natural Language Processing (NLP) to a context associated with the image to get an output indicating a subject of the context;

identify one or more original objects from the image;

select, based on the identified one or more original objects and based on the NLP, a first object from the one or more identified original objects corresponding to the subject of the context, wherein the selecting includes matching a label that corresponds to one of the one or more identified original objects with the subject according to the output and determining that the one of the one or more identified original objects corresponds to the matched label as the first object;

estimate a time to load the image by a user;

perform, based on the estimated time being longer than a threshold, a compression of the first object, wherein the compressed first object has a second resolution that is not higher than the first resolution;

obtain a first background having a third resolution, wherein the first background corresponds to a portion of the image having at least the original background, and wherein the third resolution is lower than the second resolution; and send the compressed first object and the first background to the user to display a processed image.

7. The computer program product of claim 6, wherein the first background is a low resolution image obtained by compressing a selection from the group consisting of: the image, and a remaining part of the image which excludes the original object corresponding to the first object.

8. The computer program product of claim 6, wherein the instructions, when executed on the device, further cause the device to:

in response to a second object different from the first object being requested by the user, obtain the second object, wherein the second object corresponds to at least one of the one or more original objects, the second object has a fourth resolution and the fourth resolution is not higher than the first resolution and is higher than the third resolution; and send the second object to the user.

9. A computing system, the system comprising:

a memory storing instructions thereon for image processing, wherein an image includes one or more original objects and an original background, wherein the image has a first resolution; and a processor, the processor communicatively coupled to the memory, based on the stored instructions the processor configured to:

identify one or more original objects from the image;

perform Natural Language Processing (NLP) to a context associated with the image to get an output indicating a subject of the context associated with the image;

select, according to the subject, a first object from the one or more identified original objects, wherein the selecting includes matching a label that corresponds to one of the one or more identified original objects with the subject according to the output and determining that the one of the one or more identified original objects corresponds to the matched label as the first object, wherein the first object has a second resolution, and wherein the second resolution is not higher than the first resolution;

estimate a time to load the image by a user according to a user network condition and a size of the image;

perform, in response to the estimated time being longer than a threshold, a compression of a first background;

obtain the first background having a third resolution, wherein the first background corresponds to a portion of the image including at least the original background, and wherein the third resolution is lower than the second resolution; and send the first object and the first compressed background to the user to display a processed image.

10. The computing system of claim 9, further comprising:

in response to a second object different from the first object being requested by the user, obtaining the second object, wherein the second object corresponds to at least one of the one or more original objects, wherein the second object has a fourth resolution, and wherein the fourth resolution is not higher than the first resolution and is higher than the third resolution; and sending the second object to the user.

* * * * *